US012650188B2

(12) United States Patent
Mariaca et al.

(10) Patent No.: US 12,650,188 B2
(45) Date of Patent: Jun. 9, 2026

(54) MULTI-CONNECTOR COOLANT UNIT

(71) Applicant: GM GLOBAL TECHNOLOGY OPERATIONS LLC, Detroit, MI (US)

(72) Inventors: Everardo Daleth Adan Mariaca, Puente de Ixtla (MX); Christian Reyes Victoria, Ocoyoacac (MX); Jesus Reyes Garcia, Zinacantepec (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 308 days.

(21) Appl. No.: 18/519,836

(22) Filed: Nov. 27, 2023

(65) Prior Publication Data

US 2025/0172225 A1     May 29, 2025

(51) Int. Cl.
B60K 11/02     (2006.01)
F16L 27/08     (2006.01)
H01M 10/613     (2014.01)
H01M 10/625     (2014.01)
H01M 10/6568     (2014.01)

(52) U.S. Cl.
CPC .......... F16L 27/0849 (2013.01); B60K 11/02 (2013.01); H01M 10/613 (2015.04); H01M 10/625 (2015.04); H01M 10/6568 (2015.04); H01M 2220/20 (2013.01)

(58) Field of Classification Search
CPC ............ B60H 1/00571; B60H 1/00278; B60H 1/00392; H01M 10/613; H01M 10/625; H01M 10/6568; H01M 2220/20; B60K 11/02; F16L 27/0849
See application file for complete search history.

(56) References Cited

U.S. PATENT DOCUMENTS

| | | | | |
|---|---|---|---|---|
| 5,586,791 A | * | 12/1996 | Kirchner ................. | F16L 43/02 |
| | | | | 285/179 |
| 9,803,545 B1 | * | 10/2017 | Whitmer ................. | F02B 77/04 |
| 2007/0046020 A1 | * | 3/2007 | Brass ....................... | F16J 15/00 |
| | | | | 285/98 |
| 2013/0327418 A1 | * | 12/2013 | Ho .......................... | B60R 99/00 |
| | | | | 137/234.6 |

FOREIGN PATENT DOCUMENTS

DE           4429498 C1     8/1995

* cited by examiner

*Primary Examiner* — Lori Wu
(74) *Attorney, Agent, or Firm* — Ingrassia Fisher & Lorenz, LLP | IF&L

(57)     ABSTRACT

In an exemplary embodiment, a coolant system is provided that includes one or more connectors and a plurality of inserted devices. The one or more connectors are each configured to facilitate flow of coolant fluid of the coolant system, and each include a base and a plurality of ports. The base defines fluid passageways therein. The plurality of ports are coupled to the fluid passageways, and are configured to allow the flow of the coolant fluid therethrough. Each of the ports includes a rotatable head and a plurality of stops. The plurality of inserted devices each have respective mating components, and are each inserted within a respective one of the ports at an angle that is determined based on an engagement of the respective mating components with one or more of the plurality of stops of the rotatable head of the respective port.

13 Claims, 4 Drawing Sheets

MULTI-CONNECTOR COOLANT UNIT

INTRODUCTION

The technical field generally relates to the field of coolant systems for platforms, including mobile platforms such as vehicles.

Various vehicles and other platforms today have coolant units for providing coolant to one or more systems, such as for rechargeable energy storage systems (RESS), motors or engines, controllers, and/or other components. However, existing coolant units may not always include an optimal configuration, for example with respect to functionality, compactness, and versatility.

Accordingly, it is desirable to provide systems and devices for coolant units, such as for vehicles or other platforms. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a coolant system is provided that includes one or more connectors and a plurality of inserted devices. The one or more connectors are each configured to facilitate flow of coolant fluid of the coolant system, and each include a base and a plurality of ports. The base defines fluid passageways therein. The plurality of ports are coupled to the fluid passageways, and are configured to allow the flow of the coolant fluid therethrough and to connect to other connectors or components. Each of the ports includes a rotatable head and a plurality of stops. The plurality of inserted devices each have respective mating components, and are each inserted within a respective one of the ports at an angle that is determined based on an engagement of the respective mating components with one or more of the plurality of stops of the rotatable head of the respective port.

Also in an exemplary embodiment, the one or more connectors are configured for modular insertion, removal, and angular positioning and repositioning of the inserted devices via the rotatable heads.

Also in an exemplary embodiment, the one or more connectors include at least two connectors, namely, a first connector and a second connector.

Also in an exemplary embodiment, the plurality of inserted devices includes a reservoir for the coolant fluid.

Also in an exemplary embodiment, the plurality of inserted devices further includes a first pump and a second pump for circulation of the coolant fluid.

Also in an exemplary embodiment, the plurality of inserted devices further includes a valve for control of the coolant fluid.

Also in an exemplary embodiment, the reservoir and the first pump are coupled to the first connector: the second pump is coupled to the second connector; and the valve is coupled to both the first connector and the second connector, between the first and second connectors.

Also in an exemplary embodiment, the second connector is further configured to be coupled to an additional component of a mobile platform.

Also in an exemplary embodiment, the second connector is further configured to be coupled to a device of a vehicle.

Also in an exemplary embodiment, the device comprises a rechargeable energy storage system of the vehicle.

In another exemplary embodiment, a connector for a coolant system is provided that includes: a base defining fluid passageways therein; and a plurality of ports coupled to the fluid passageways, wherein the plurality of ports are configured to allow the flow of the coolant fluid therethrough, wherein each of the ports includes a rotatable head and a plurality of stops, and wherein each of the plurality of ports is configured for insertion of a respective one of a plurality of inserted devices that each having respective mating components and that are each inserted within a respective one of the ports at an angle that is determined based on an engagement of the respective mating components with one or more of the plurality of stops of the rotatable head of the respective port.

In another exemplary embodiment, a mobile platform is provided that includes a body: a propulsion system: one or more components requiring cooling; and a coolant system for cooling the one or more components. The coolant system includes one or more connectors configured to facilitate flow of coolant fluid of the coolant system, the one or more connectors including: a base defining fluid passageways therein; and a plurality of ports coupled to the fluid passageways, wherein the plurality of ports are configured to allow the flow of the coolant fluid therethrough, wherein each of the ports includes a rotatable head and a plurality of stops; and a plurality of inserted devices that each having respective mating components and that are each inserted within a respective one of the ports at an angle that is determined based on an engagement of the respective mating components with one or more of the plurality of stops of the rotatable head of the respective port.

Also in an exemplary embodiment, the one or more connectors are configured for modular insertion, removal, and angular positioning and repositioning of the inserted devices via the rotatable heads.

Also in an exemplary embodiment, the one or more connectors include at least two connectors, namely, a first connector and a second connector.

Also in an exemplary embodiment, the plurality of inserted devices includes a reservoir for the coolant fluid.

Also in an exemplary embodiment, the plurality of inserted devices further includes a first pump and a second pump for circulation of the coolant fluid.

Also in an exemplary embodiment, the plurality of inserted devices further includes a valve for control of the coolant fluid.

Also in an exemplary embodiment, the reservoir and the first pump are coupled to the first connector; the second pump is coupled to the second connector; and the valve is coupled to both the first connector and the second connector, between the first and second connectors.

Also in an exemplary embodiment, the mobile platform includes a vehicle; the one or more components requiring cooling include a device of the vehicle; and the second connector is further configured to be coupled to the device.

Also in an exemplary embodiment, the device comprises a rechargeable energy storage system of the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
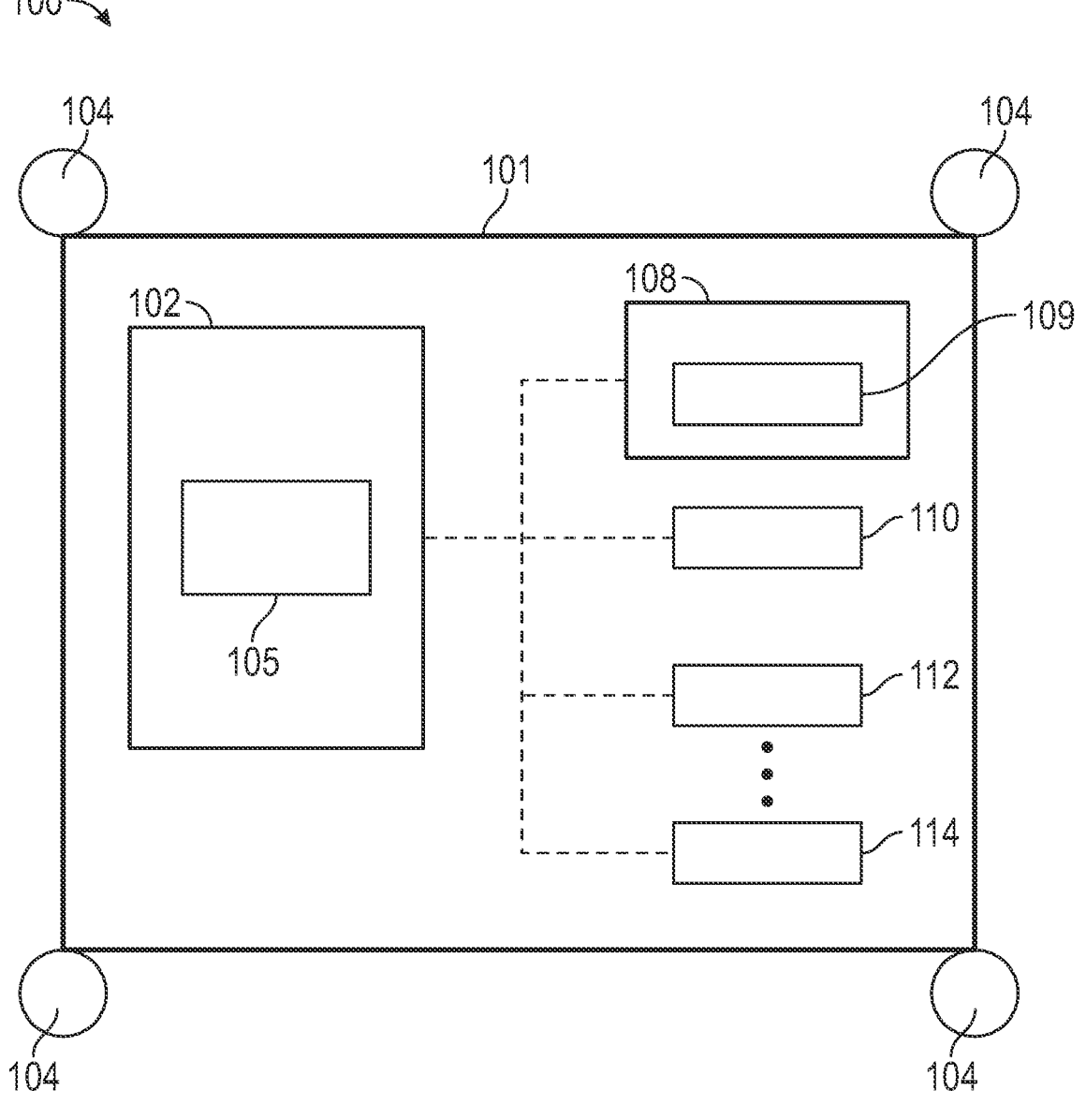
FIG. 1 is a functional block diagram of a platform, such as a vehicle, having a coolant system with multiple connectors for providing coolant for one or more systems and/or other components of the platform, in accordance with an exemplary embodiment.

FIG. 1 illustrates a platform 100, according to an exemplary embodiment. As described in greater detail further below, the platform 100 includes a coolant system 102 with multiple connectors 105 for providing coolant for one or more systems and/or other components of the platform, in accordance with an exemplary embodiment.

In certain embodiments, the platform 100 comprises a vehicle, such as an automobile. In various embodiments, the platform 100 may be any one of a number of different types of automobiles, such as, for example, a sedan, a wagon, a truck, or a sport utility vehicle (SUV), performance car convertible or coupe, and so on, and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the platform 100 may also comprise a motorcycle and/or one or more other types of vehicles. In addition, in various embodiments, it will also be appreciated that the platform 100 may comprise any number of other types of vehicles, and/or any one of a number of different types of mobile platforms and/or other platforms.

In the depicted embodiment, the platform 100 includes a body 101 that substantially encloses other components of the platform 100. Also in the depicted embodiment, the platform 100 includes one or more wheels 104. In various embodiments, the wheels 104 are each rotationally coupled to one or more of the axles (not depicted) near a respective corner of the body 101 to facilitate movement of the platform 100. In one embodiment, the platform 100 includes four wheels 104, although this may vary in other embodiments (for example for trucks and certain other vehicles).

In various embodiments, the platform 100 further includes a drive system 108, a rechargeable energy storage system (RESS) 110, one or more control systems 112, and one or more other systems 114.

In various embodiments, the drive system 108 includes one or more motors 109, such as one or more electric motors, gas turbine engines, hybrid motors, or the like.

Also in various embodiments, the RESS 110 includes one or more batteries and/or other rechargeable storage system, for providing power to the motor 109 and/or to one or more vehicle systems.

In addition, in various embodiments, the control systems 112 control operation of the drive system 108 (e.g., of the motor 109 thereof), the RESS 110, the coolant system 102, and/or other systems of the platform 100 (e.g., via one or more processors, sensors, and/or other components of the control systems 112).

Also in various embodiments, the platform 100 may further include any number of other systems 114, for example including one or more heating systems, steering systems, braking systems, radiators, communication systems, climate control systems, infotainment systems, and so on In various embodiments, the coolant system 102 provides coolant fluid to various components of the platform 100, such as the motor 109, RESS 110, control systems 112, and other systems 114 of the platform 100. Also in various embodiments, the configuration of the connectors 105 of the coolant system 102 provides for a modular structure and configuration for the coolant system 102 that provides for potentially improved functionality, compactness, versatility, and simplicity with respect to the coolant system 102 and the platform 100.

Figure 2:
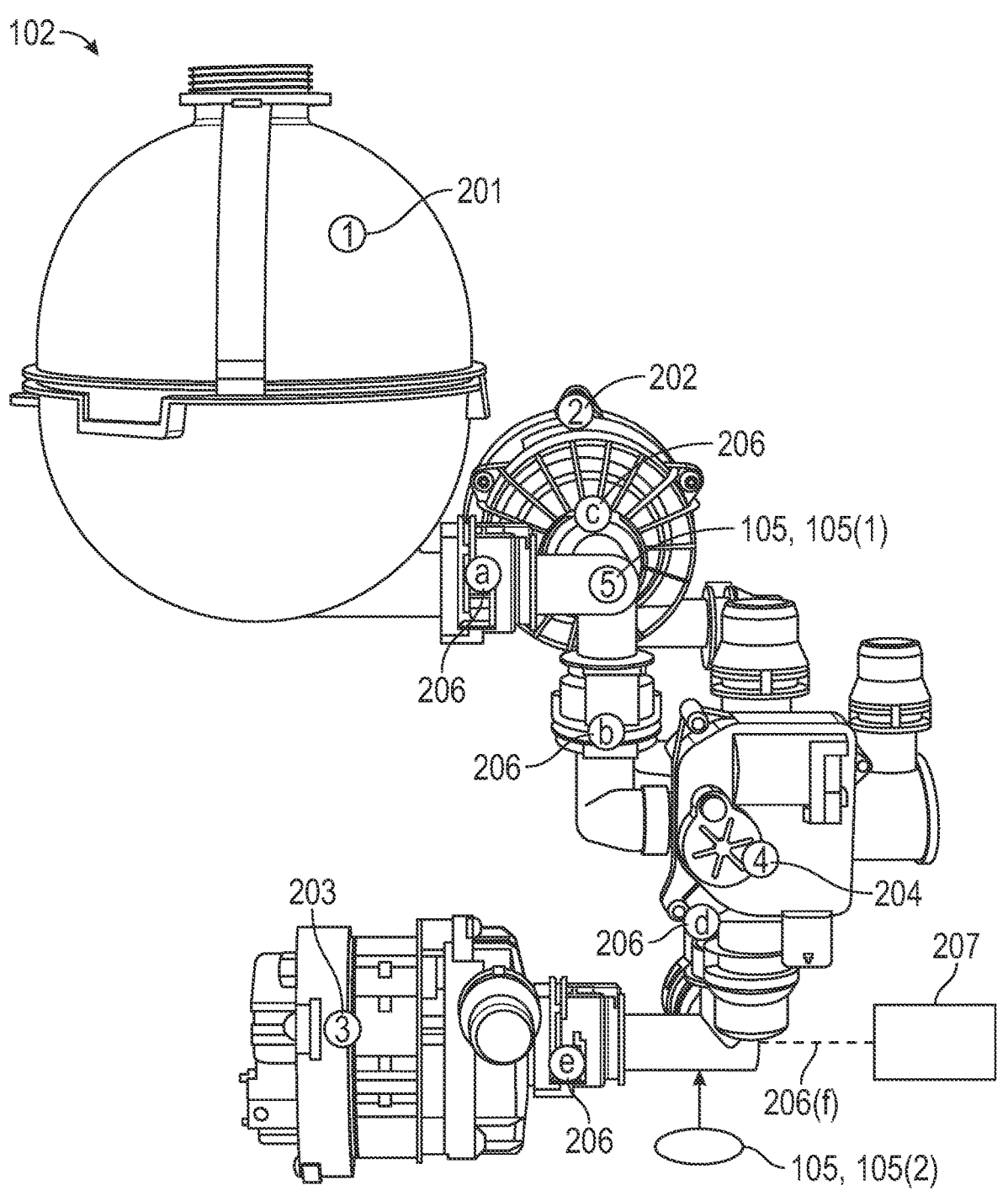
FIG. 2 is a schematic diagram of a coolant system with multiple connectors that can be implemented in connection with the platform of FIG. 1, in accordance with an exemplary embodiment.

With reference to FIG. 2, a schematic illustration is provided for the coolant system 102 of the platform 100 of FIG. 1, including the connectors 105 as well as other components thereof. Specifically, in the exemplary embodiment depicted in FIG. 2, the coolant system 102 includes two connectors 105, namely a first connector 105(1) and a second connector 105(2).

Also as depicted in FIG. 2, the coolant system 102 further includes a surge tank 201, a plurality of pumps 202, 203 (including a first pump 202 and a second pump 203), and a valve 204. In various embodiments, the surge tank 201 serves as a reservoir for coolant fluid. In addition, in various embodiments, the pumps 202, 203 circulate the coolant fluid through the coolant system 102 and other platform devices, such as the RESS 110 of FIG. 1, and/or in certain embodiments, one or more of the drive system 108 (such as the motor 109 thereof), control systems 112, and/or other systems 114 of the platform 100 of FIG. 1 (e.g., one or more heaters and/or other systems and/or devices). Also in various embodiments, the valve 204 comprises a six way valve that guides the flow of the coolant fluid to the various components.

As depicted in FIG. 2, in various embodiments each of the connectors 105 include respective ports 206 through which the coolant fluid flows, and which connect to other connectors or components. Specifically, in the depicted embodiment: (i) the first connector 105(1) includes a first port 206(a), a second port 206(b), and a third port 206(c); and (ii) the second connector 105(2) includes a respective first port 206(d), second port 206(e), and third port 206(f).

In various embodiments, with respect to the first connector 105(1): (i) the first port 206(a) is connected to and coupled to the surge tank 201: (ii) the second port 206(b) is connected to and coupled to the valve 204; and (iii) the third port 206(c) is connected to and coupled to the first pump 202.

Also in various embodiments, with respect to the second connector 105(2): (i) the first port 206(d) is connected to and coupled to the valve 204 (i.e., such that the valve 204 is coupled to both the first and second connectors 105(1), 105(2), therebetween): (ii) the second port 206(e) is connected to and coupled to the second pump 203; and (iii) the third port 206(f) is coupled to and connected to one or more other components 207 of the platform 100 of FIG. 1 (such as the RESS 110, and/or in certain embodiments to one or more heaters and/or other components).

With reference to FIGS. 3A, 3B 3C, and 3D, close-up views are provided of a connector 105 of the coolant system 102 of FIGS. 1 and 2, facing different respective directions, in accordance with an exemplary embodiment. As depicted in FIGS. 3A-3D, in an exemplary embodiment each connector 105 comprises a base 302 along with three ports 206.

In various embodiments, the base 302 and ports 206 define respective passageways therein for the follow of the coolant fluid. Also in various embodiments, each of the ports 206 includes a respective rotatable head 304 that defines and surrounds an opening 306 for the flow of coolant fluid therethrough. As depicted in FIGS. 3A-3D, in various embodiments, each head 304 is rotatable via any number of degrees "X" 307. In certain embodiments, each head 304 is rotatable. In various embodiments, the number of degrees X 307 of rotation may be any number of degrees up to three hundred sixty (360) degrees as permitted by the configuration of the port.

Figures 3A, 3B, 3C, 3D:
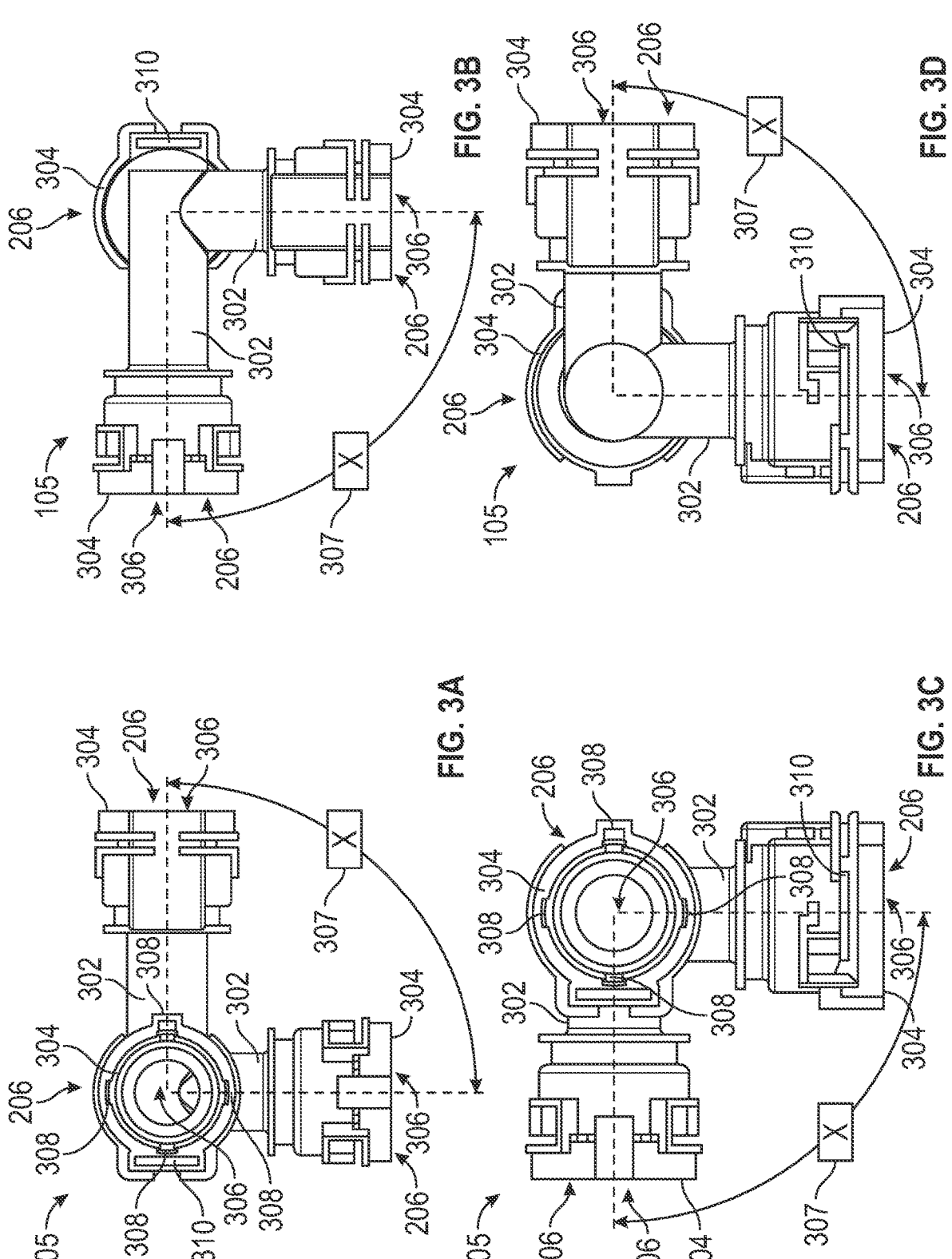
FIGS. 3A 3B 3C, and 3D provide respective close-up views of a connector of the coolant system of FIGS. 1 and 2, facing different respective directions, in accordance with an exemplary embodiment.

In addition, as depicted in FIGS. 3A and 3C, in various embodiments each head 304 includes or is coupled to a plurality of stops 308 for the respective port 206. In various embodiments, each stop 308 is configured to engage a respective mating component of a device that is configured to be inserted into the respective port 206 to which the particular head 304 belongs. For example, in various embodiments, and depending upon the particular port 206, the respective mating component may be part of any of the inserted devices, including the surge tank 201 of FIG. 2, one of the pumps 202, 203 of FIG. 2, the valve 204 of FIG. 2, and/or the RESS 110 and/or one or more other components of the platform 100 of FIG. 1. In certain embodiments, the stops 308 of the port 206 (i.e., that are part of or coupled to the respective head 304 of the port 206) comprise protrusions that are configured to engage respective mating components of the device inserted into the respective port 206, to thereby prevent further engagement of the head 304 and lock the inserted device into the port 206 at a particular desired angle.

Also in an exemplary embodiment, as depicted in FIGS. 3A-3D, each head 304 (or the respective port 206 to which the head 304 belongs) also includes a plurality of inspection cavities 310. In various embodiments, each inspection cavity 310 is configured to reveal, for inspection, a bar code and/or other identifier of the device that is inserted into the respective port 206. Specifically, in various embodiments, the bar code of the inserted device is not visible until the component is fully inserted into the port 206, at which point the bar code of the inserted device is visible via the inspection cavities 310. In various embodiments, the inspection cavities 310 can then be utilized to ascertain the model and type of the inserted device, for example for quality control purposes, for eventual maintenance or replacement or may be required, and so on. In certain embodiments, the inspection cavities 310 may be utilized for inspection regardless of whether the connectors 105 have QR codes. In addition, in certain embodiments, the inspection cavities 310 may not be needed altogether.

Figure 4:
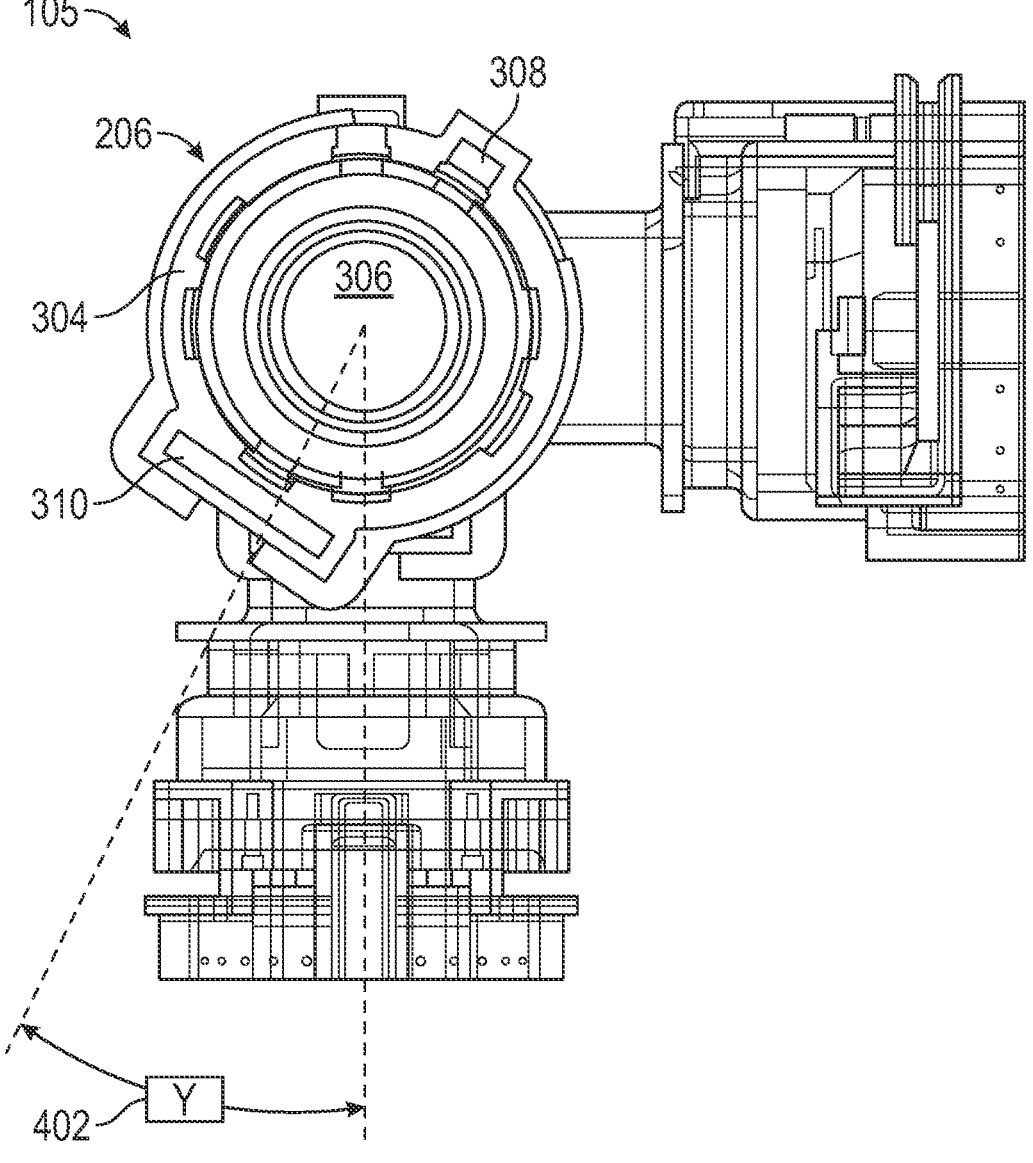
FIG. 4 depicts another view of the connector of FIGS. 3A, 3B, 3C, and 3D, with a close-up view of a head thereof, in accordance with an exemplary embodiment.

With reference now to FIG. 4, another view is provided of the connector 105 of FIGS. 3A, 3B, 3C, and 3D, with a close-up view of a head 304 thereof, in accordance with an exemplary embodiment. Specifically, FIG. 4 depicts a close-up view of one of the heads 304, including the opening 306 formed thereby, along with an exemplary stop 308 and inspection cavity 310 of the port 206 to which the head 304 belongs, as described above. Also as depicted in FIG. 4, in certain embodiments the head 304 is configured to be rotated every "Y" degrees 402 at a time.

Accordingly, coolant systems are provided for platforms, such as vehicles. In various embodiments, the coolant system features a modular design with multiple connectors. In various embodiments, each of the connectors includes a plurality of ports for connecting to various components of the coolant system and/or to one or more components of the platform (e.g., vehicle) that requires cooling via the passage of coolant fluid thereto.

In addition, as described above, in various embodiments each port includes a rotatable head along with stops that are configured to mate with respective components of the devices that are inserted inside the ports. This provides for a potentially compact design for the coolant system as well as for the platform (e.g., vehicle) as a whole, along with flexibility for insertion and removal, along with the angular positioning, of the inserted devices. This in turn provides flexibility for interchangeability of the different inserted components and the positioning thereof, and further facilitates subsequent changes to the inserted components and the positioning thereof (e.g., for modification, replacement, and/or maintenance), all while maintaining a compact, modular environment. Additionally, in various embodiments, the disclosed coolant systems eliminate or reduce the need for hoses, brackets, and other components of traditional coolant systems (e.g., of vehicles) while also significantly reducing the required mass and packaging space (e.g., up to ten times) as compared with traditional coolant systems for vehicles.

It will be appreciated that the systems, platforms, applications, and implementations may vary from those depicted in the Figures and described herein. For example, in various embodiments, the platform 100, coolant system 102, components thereof, and/or other components may differ from those depicted in FIGS. 1 and 2 and/or described above in connection therewith. It will also be appreciated that the configuration and implementation of the connectors 105 and components thereof and/or coupled thereto may differ from those depicted in FIGS. 3A-3D and FIG. 4 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A coolant system comprising:
one or more connectors configured to facilitate flow of coolant fluid of the coolant system, the one or more connectors including:
a base defining fluid passageways therein; and
a plurality of ports coupled to the fluid passageways, wherein the plurality of ports are configured to allow the flow of the coolant fluid therethrough, wherein each of the ports includes a rotatable head and a plurality of stops; and
a plurality of inserted devices that each having respective mating components and that are each inserted within a respective one of the ports at an angle that is determined based on an engagement of the respective mating components with one or more of the plurality of stops of the rotatable head of the respective port;

wherein the one or more connectors comprise at least two connectors, including a first connector and a second connector;

wherein the plurality of inserted devices comprises a reservoir for the coolant fluid; and wherein the plurality of inserted devices further comprises a first pump and a second pump for circulation of the coolant fluid.

2. The coolant system of claim 1, wherein the one or more connectors are configured for modular insertion, removal, and angular positioning and repositioning of the inserted devices via the rotatable heads.

3. The coolant system of claim 1, wherein the plurality of inserted devices further comprises a valve for control of the coolant fluid.

4. The coolant system of claim 3, wherein:

the reservoir and the first pump are coupled to the first connector;

the second pump is coupled to the second connector; and the valve is coupled to both the first connector and the second connector, between the first and second connectors.

5. The coolant system of claim 4, wherein the second connector is further configured to be coupled to an additional component of a mobile platform.

6. The coolant system of claim 5, wherein the second connector is further configured to be coupled to a device of a vehicle.

7. The coolant system of claim 6, wherein the device comprises a rechargeable energy storage system of the vehicle.

8. A mobile platform comprising:

a body;

a propulsion system;

one or more components requiring cooling; and a coolant system for cooling the one or more components, the coolant system comprising:

one or more connectors configured to facilitate flow of coolant fluid of the coolant system, the one or more connectors including:

a base defining fluid passageways therein; and a plurality of ports coupled to the fluid passageways, wherein the plurality of ports are configured to allow the flow of the coolant fluid therethrough, wherein each of the ports includes a rotatable head and a plurality of stops; and a plurality of inserted devices that each having respective mating components and that are each inserted within a respective one of the ports at an angle that is determined based on an engagement of the respective mating components with one or more of the plurality of stops of the rotatable head of the respective port;

wherein the one or more connectors comprise at least two connectors, including a first connector and a second connector;

wherein the plurality of inserted devices comprises a reservoir for the coolant fluid; and wherein the plurality of inserted devices further comprises a first pump and a second pump for circulation of the coolant fluid.

9. The mobile platform of claim 8, wherein the one or more connectors are configured for modular insertion, removal, and angular positioning and repositioning of the inserted devices via the rotatable heads.

10. The mobile platform of claim 8, wherein the plurality of inserted devices further comprises a valve for control of the coolant fluid.

11. The mobile platform of claim 10, wherein:

the reservoir and the first pump are coupled to the first connector;

the second pump is coupled to the second connector; and the valve is coupled to both the first connector and the second connector, between the first and second connectors.

12. The mobile platform of claim 11, wherein:

the mobile platform comprises a vehicle;

the one or more components requiring cooling comprise a device of the vehicle; and the second connector is further configured to be coupled to the device.

13. The mobile platform of claim 12, wherein the device comprises a rechargeable energy storage system of the vehicle.

* * * * *